United States Patent Office 3,455,630
Patented July 15, 1969

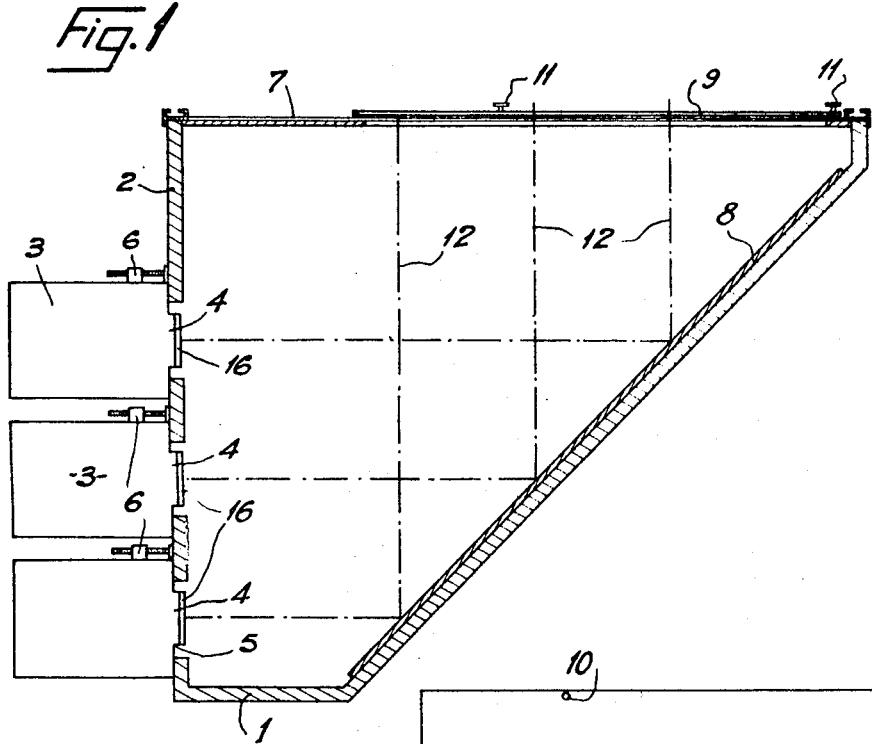
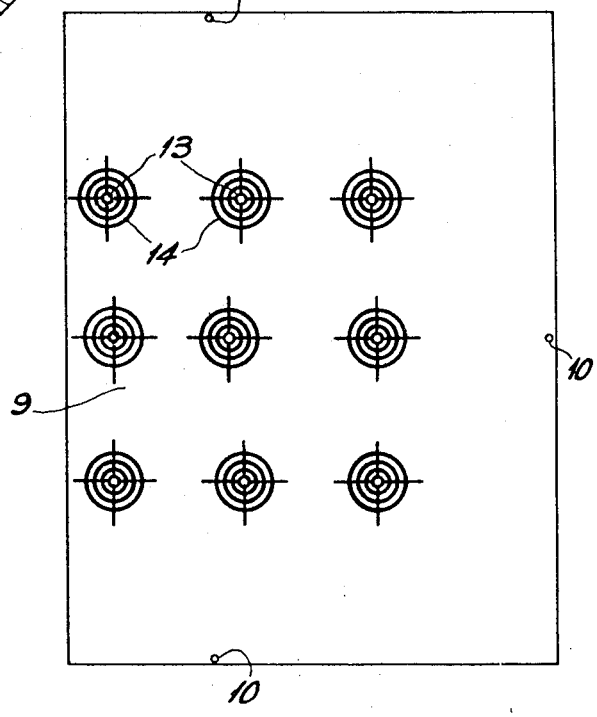

3,455,630
APPARATUS FOR ADJUSTING THE POSITION OF THE OPTICAL AXIS OF A PROJECTOR WITH RESPECT TO A SCREEN
Jean Pierrat, Versaille, Yvelines, France, assignor to Societe Anonyme des Ateliers d'Aviation Louis Breguet, Paris, France, a corporation of France
Filed Apr. 18, 1966, Ser. No. 543,218
Claims priority, application France, Apr. 21, 1965, 14,114
Int. Cl. G03b 21/00, 21/14; G01j 1/00
U.S. Cl. 353—70         3 Claims

ABSTRACT OF THE DISCLOSURE

An apparatus for controlling the position of the optical axis of a projector with respect to a screen. The apparatus has a mirror perpendicular to the optical axis of the projector and a panel formed with a small aperture surrounded by a target. The panel is arranged in such a way that it can replace the screen. The aperture of the panel is situated at the place where a beam extending along the optical axis of the projector impinges upon the panel if the projector is properly adjusted.

---

This invention relates to an apparatus for adjusting the position of the optical axis of a projector with respect to a screen. The apparatus is applicable more particularly to luminous information display panels of the type comprising a screen on which projectors can form images corresponding to various information elements that the panel is required to display. In panels of this type, in fact, the position of the optical axes of the projectors must be adjusted critically with respect to the projection plane, i.e. the screen, in order to obtain maximum precision as regards the information.

The invention also covers the luminous information display panel to which the above control apparatus has been applied.

According to the invention, adjustment of the position of the optical axis of a projector in respect to a screen is characterized in that a mirror perpendicular to the optical axis of the projector is associated with the latter, the screen is replaced by a panel formed with a small aperture at the place where a beam directed along the optical axis of the projector would impinge upon the said panel if the position of the projector really were correct, the internal surface of the panel having a target around the said aperture. The image of the target as seen through the aperture is noted and if necessary the position of the projector is adjusted so that the image of the target is centered with respect to the aperture.

The invention is illustrated by way of example in the accompanying drawings, in which:

FIGURE 1 is a diagrammatic vertical section of a luminous information display panel to which the apparatus according to this invention is applicable;

FIGURE 2 is a bottom plan view of the top of the control panel;

Figure 3:
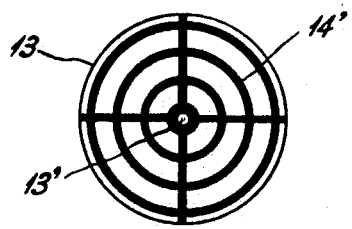
FIGURE 3 is a detail to an enlarged scale showing what the observer sees as he carries out adjustment, if such adjustment is correct.

Referring to FIGURE 1, a luminous information display panel in the form of a truncated parallelepiped has, for example, nine projectors 3 disposed in its front surface 2.

The lens mount 4 of each of the projectors is an exact fit in a bore 5 in the surface 2, with respect to which it can move for adjustment purposes. Three screw jacks 6 arranged at 120° from one another are associated with each projector and enable the direction of the optical axis to be adjusted.

The projection screen (not shown) is mounted in the top horizontal surface 7 of the table, projection being by way of a 45° mirror 8 suitably situated in front of the projectors, so that the size of the panel can be reduced.

For initial adjustment of the table, the optical axes of the projectors must occupy a position such that a beam of light emitted along such an axis will impinge upon the screen perpendicularly thereto.

Since the position of the projectors and of the screen is known, it is a simple task to determine exactly the point at which a beam of light extending along the optical axis of a given projector must impinge upon the screen if the projector is properly adjusted.

To enable such adjustment to be carried out easily, a panel 9 is made, and is shown in FIGURE 2. After removal of the screen, panel 9 takes the place of at least part of the screen. The panel 9 which can be in the form of an ordinary rigid metal sheet has means whereby its position with respect to the table can be exactly adjusted. In this example it is formed with apertured 10 corresponding to other apertures (not shown) provided in the table, fixing pins 11 being fitted in the various apertures.

Small apertures 13, a few millimeters in diameter, for example 3 millimeters, are formed at the places in the panel 9 where the beams of light 12 extending along the optical axes of the projectors should impinge upon the panel if the projectors are properly adjusted. In the specific embodiment illustrated, therefore, the panel has 9 apertures arranged to correspond to the 9 projectors.

Targets 14, the use of which will be described hereinafter, (FIGURE 2) are marked out on the inner surface of the panel 9 around each aperture 13. A plane mirror perpendicular to the optical axis of each projector is associated with each projector and may consist of the surface of a coloured filter mounted on the projector lens.

FIGURES 3 to 6 show how adjustment is carried out. To simplify the illustration, the mirror 8 has been eliminated, in which case the panel 9 is situated opposite the projector 3.

Figure 5:
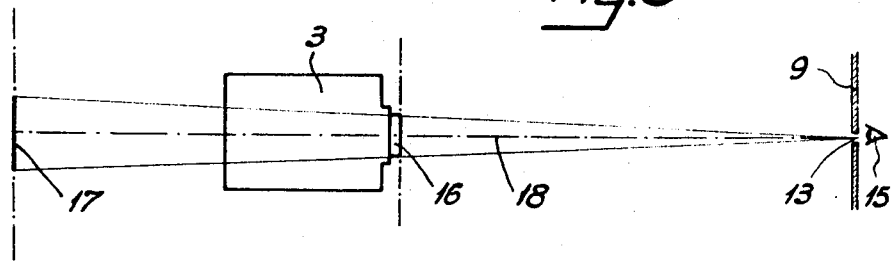
FIGURES 5 and 6 are schematic diagrams showing correct and incorrect adjustment respectively.

When the panel 9 has been put into position, the operator places his eye 15 in front of the aperture 13 corresponding to the projector 3; the mirror 16 associated with the projector shows the operator the image 17 of the inner surface of the panel. If the adjustment is correct, i.e. if the optical axis 18 of the projector is exactly perpendicular to the panel 9 and passes through the centre of the aperture 13 as shown in FIGURE 5, the operator will see the image 13' of the aperture 13 at the centre of such aperture and hence the image 14' of the target 14 concentric with the aperture 13 as shown in FIGURE 3.

Figure 4:
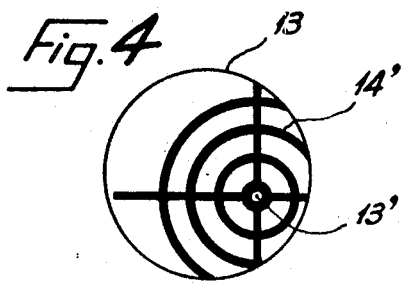
FIGURE 4 is a similar view which shows the case of an incorrect adjustment.
Figure 6:
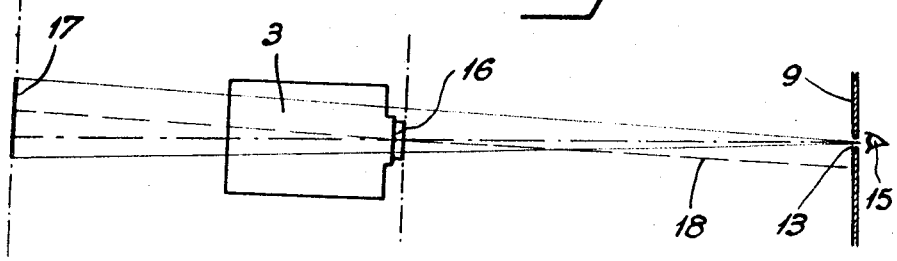

On the other hand, if the adjustment is incorrect, as shown in FIGURES 4 and 6 the image of the aperture and of the target will appear eccentric with respect to the aperture 13. The position of the projector is adjusted by bringing the image of the target in line with the centre of the aperture 13 by means of the jacks 6. This adjustment is possible with high accuracy; with the naked eye the errors obtained are only of the order of a few minutes of an arc.

I claim:

1. An information display apparatus comprising in combination:
   a housing having a plurality of faces, one of which is pierced with a bore and another one provided with an aperture;

a screen adapted to be removably mounted on said housing in front of said aperture;

a projector located outside said housing and having a lens mount engaged within said bore;

means for adjustably mounting said projector on said housing whereby the position of said projector with respect to said screen may be adjusted;

a transparent mirror secured to said lens mount perpendicularly to the optical axis of said projector;

a panel adapted to be removably mounted on said housing after removal and at the place of said screen, said panel being formed with a small aperture located at the place where a beam of light extending along the optical axis of said projector must impinge on said panel if the projector has been properly adjusted; and a target centered on said small aperture and marked on the face of said panel facing said housing.

2. An information display apparatus as claimed in claim 1, wherein said transparent mirror is a filter.

3. An information display apparatus as claimed in claim 1 wherein said face provided with said bore is substantially vertical and said face provided with said aperture is substantially horizontal, said housing containing a plane mirror adapted to reflect the rays from said projector towards said aperture.

References Cited

UNITED STATES PATENTS

| 2,459,418 | 1/1949 | Ellis | 88—14 |
| 3,080,801 | 3/1963 | Merritt | 95—1.1 |

FOREIGN PATENTS 888,538    1/1962    Great Britain.

NORTON ANSHER, Primary Examiner

R. P. GREINER, Assistant Examiner

U.S. Cl. X.R.

356—121